Feb. 10, 1970 J. ELBLING 3,495,144

DIGITAL POSITIONING DEVICE FOR MACHINE TOOLS AND SIMILAR EQUIPMENT

Filed March 31, 1965 3 Sheets-Sheet 1

INVENTOR.

JOSEPH ELBLING

BY

Shoemaker and Mattare

ATTYS.

INVENTOR.
JOSEPH ELBLING
BY
Shoemaker and Mattare
Attys.

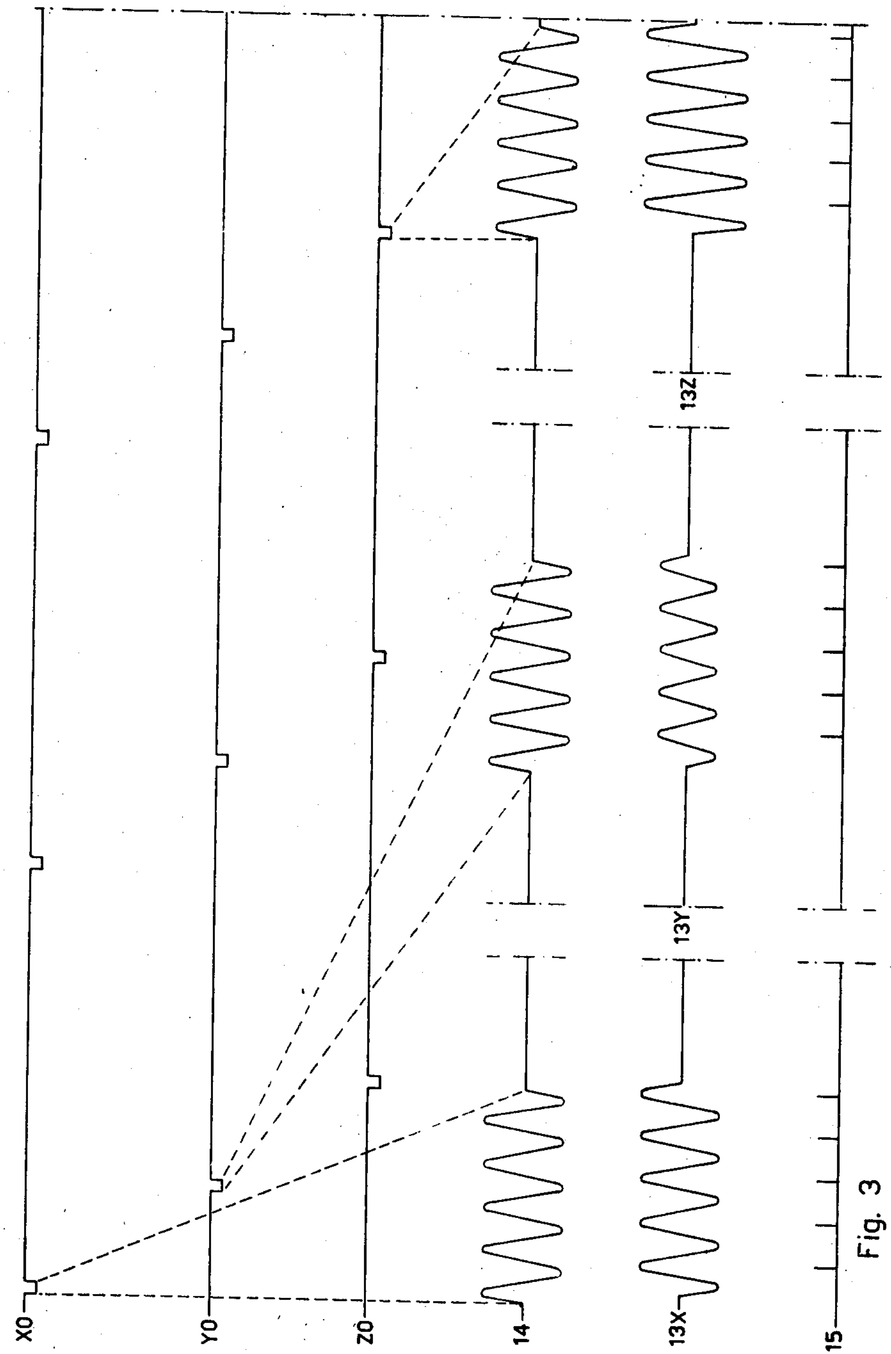
INVENTOR.
JOSEPH ELBLING
BY
Shoemaker and Mattare
ATTYS.

United States Patent Office 3,495,144
Patented Feb. 10, 1970

3,495,144

DIGITAL POSITIONING DEVICE FOR MACHINE TOOLS AND SIMILAR EQUIPMENT

Joseph Elbling, Ivrea, Italy, assignor to Ing. C. Olivetti & C., S.p.A., Ivrea, Italy, a corporation of Italy Filed Mar. 31, 1965, Ser. No. 444,207
Claims priority, application Italy, Apr. 7, 1964, 7,519/64
Int. Cl. G05b *11/01*
U.S. Cl. 318—18 5 Claims

ABSTRACT OF THE DISCLOSURE

In a control device for positioning a movable member of a machine tool with respect to an absolute reference point, a servosystem responsive to positional orders applied thereto by a program device includes a displaceable reference member having relative reference point, and means manually operable prior to starting operation of said program device for displacing said reference member with respect to said absolute reference point to compensate for difference between said absolute and relative reference points.

The present invention refers to a digital position control device for machine tools and similar equipments, and more particularly to a device provided with means for initially setting a movable part of the machine in a predetermined reference position.

In the digital position control device for a plural-axis machine tool described in a copending patent application Ser. No. 400,986 filed Oct. 2, 1964, a part of the machine, movable with respect to an absolute reference point, is positioned, along each axis and with respect to said absolute reference point by a servosystem comprising a reference member and controlled by a series of digital positional orders recorded on a program unit, e.g. a magnetic tape, and representing predetermined successive positions of said movable part defined with respect to a relative reference point other than said absolute reference point, said program orders being interpreted by said servosystem as relating to its own reference member.

In a device of this type, said movable part must initially be set in a predetermined position. Thereafter, starting from said initial position, the movable part describes a continuous path or trajectory under the control of said program unit. More particularly, said movable part may consist, e.g., of the work-table of the machine tool carrying a workpiece to be machined, by means of a fixed tool, according to a profile defined by said trajectory. In this case said absolute reference point may coincide, e.g., with the position of the tool.

On the basis of the project drawing of the profile to be cut, the program recorded on the tape is usually established irrespective of the position of said absolute reference point in the machine tool, the dimensions being measured with reference to an arbitrary origin. In other words, the positions represented by said positional orders included in the program are defined with respect to a relative reference point other than said absolute reference point.

Therefore, before starting the machining of a workpiece, which may be clamped in any position on the worktable, it will be necessary to displace the worktable until said arbitrary origin, which will have been previously marked on the workpiece or on the table, coincides with the absolute reference position of the machine.

The ability of the control device to operate on a workpiece clamped in whatsoever position of the worktable irrespective of the absolute reference position of the machine is especially advantageous on large machines, where the pieces are generally big and unwieldy.

This also allows the machine to cut a given profile, defined by a given program, in different areas of a workpiece, under the control of a single program recorded on the tape.

In any case, the problem is to cut a given profile or, more generally, to cause the movable part to travel a given path described with reference to a given origin, under the control of a program established with reference to a ence of said origins.

In a known digital position control device this problem is solved by modifying each order issued from the program unit by the addition of a correcting constant stored in a memory of the device to compensate for the difference of said origins.

This obviously involves the disadvantage of a substantial complication in the structure of the control device.

Said inconvenience is obviated by the device according to the invention, which is characterized in that said reference member is displaceable with respect to said absolute reference point in order to compensate for the difference between said reference points. This and other features, objects and advantages of the invention will clearly appear from the following description of a preferred embodiment thereof, made by way of example and not in a limiting sense, with reference to the accompanying drawings in which:

FIG. 3 shows a time diagram of some signals present in the device illustrated in FIG. 1.

Figure 1:
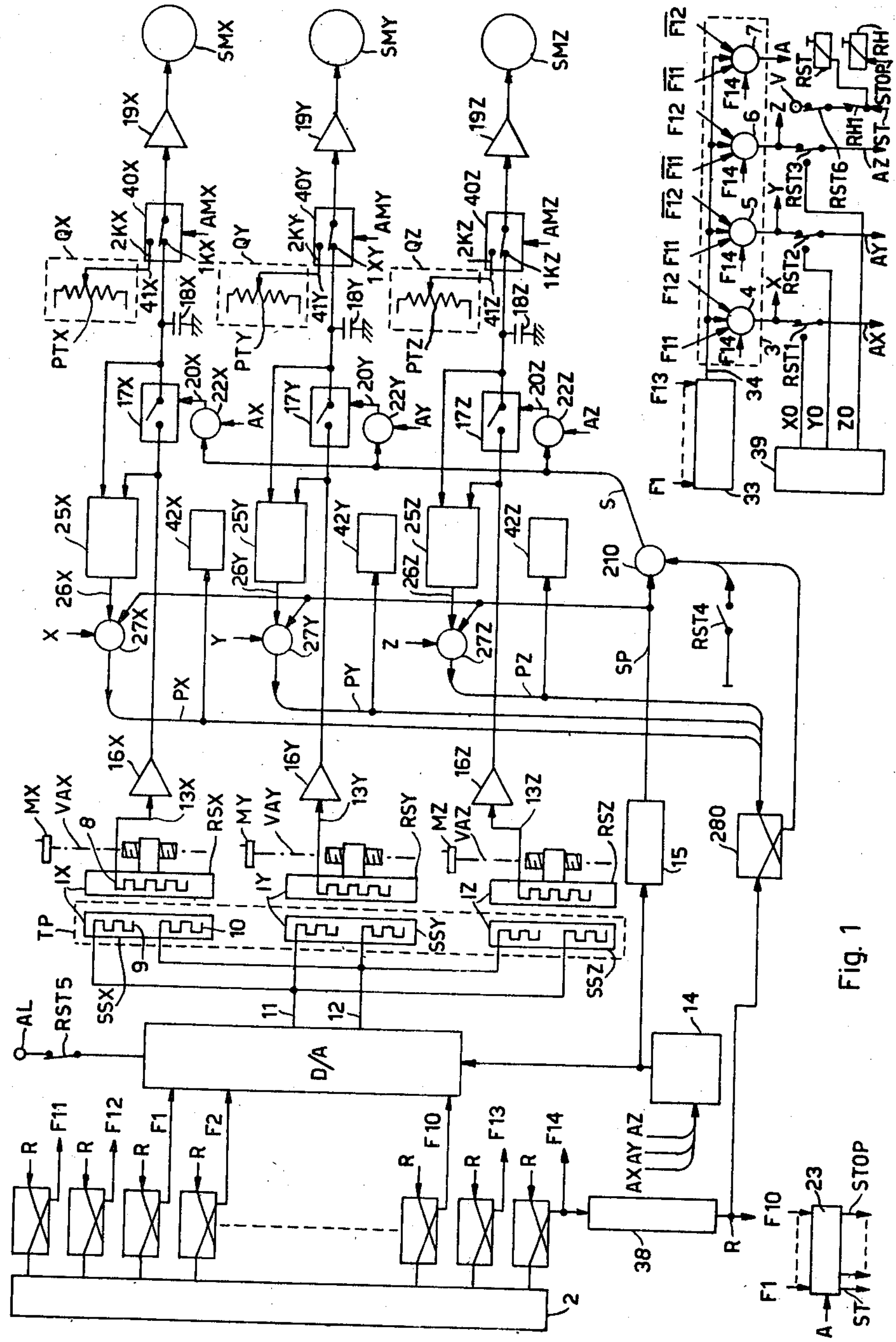
FIG. 1 shows a block diagram of the circuits of the control device according to the invention.

According to the embodiment illustrated in FIG. 1, the digital position control device is apt to control a machine tool provided with a fixed tool and with a worktable movable along three axes X, Y, Z under the control of three servomotors SMX, SMY, SMZ. Furthermore, the machine is apt to receive auxiliary orders for carrying out auxiliary operations such as lubricant control, speed change etc.

The positional and auxiliary orders are supplied to the machine by a program unit, e.g. a tape reader for a magnetic tape containing fourteen tracks, P1 to P14, namely thirteen information tracks and one clock track.

The information recorded on the tape is divided into blocks, each one consisting of four groups, each group comprising 13 bits recorded on the same line perpendicular to the tape feeding direction. In each group the first ten bits, recorded on tracks P1 to P10, respectively, represent either a positional order indicating the co-ordinate of a point to which the movable part of the machine must be brought along a certain axis, or an auxiliary order; two bits, recorded on tracks P11 and P12 respectively, represent the address of said order, i.e., they indicate whether it is a positional order relating to axis X, Y or Z or an auxiliary order; a last bit recorded on track P13 is a parity check bit, chosen so that the total number of bits equal to "1" in the group considered is always even.

A tape reader (FIG. 1) reads the 13 bits of each group on tracks P1 to P13. Said bits are stored in thirteen bistable devices F1 to F13 respectively. Outputs F1 to F10 respectively feed a digital-to-analog converter D/A common to the three axes and apt to supply an analog representation of said positional order simultaneously to three positions measuring transformers IX, IY, IZ for the three axes X, Y, Z respectively. Each one of said position measuring transformers may be of the type described in U.S.A. Patent No. 2,799,835, and comprising a fixed multi-pole winding 8 borne by a separate reference member, RSX, RSY, RSZ respectively for each axis, and a pair of movable windings 9 and 10 carried by a sensing member SSX, SSY, SSZ respectively fixed to the movable part TP (worktable) of the machine tool. Said movable part may be displaced in three directions X, Y, Z, under the control of the three servomotors SMX, SMY, SMZ mechanically coupled thereto by connecting means not shown in FIG. 1. Furthermore, according to a feature of the invention, the reference members RSX, RSY, RSZ may be independently displaced a small extent in the respective directions X, Y, Z by means of auxiliary driving screws VAX, VAY, VAZ mechanically connected to handwheels MX, MY, MZ, which can be rotated either manually or by means of auxiliary servosystems.

The position of the movable part TP with respect to the fixed portion of the machine along each axis may be represented by means of the relative displacement between the fixed winding and the movable windings belonging to said axis, expressed as an angle in electric degrees, bearing in mind that the pole pitch of the fixed winding, corresponding to 360 electric degrees, is equal, e.g., to 2 mm. In this case, the digital-to-analog converter D/A may be of the type described in a copending patent application No. 437,370, filed Mar. 5, 1965.

Said converter, being fed by a sinusoidal oscillator 14 having a frequency of e.g. 10 kHz., is apt to supply, on outputs 11 and 12 feeding the movable windings 9 and 10, sinusoidal signals having a frequency equal to 10 kHz. and a maximum amplitude proportional to the sine, respectively to the cosine, of said angle. More particularly, converter D/A comprises a set of transformers which may be selectively connected between oscillator 14 and outputs 11 and 12 by means of a set of contacts controlled by relays fed by the input signals issued from the bistable devices F1 to F10. The winding of each one of said relays has a terminal connected to the output of the corresponding bistable device F1 to F10 and the other terminal connected, through a switch RST5, to a constant potential source AL.

When the positioning device operates automatically under the control of the tape reader 2 of the program unit, contact RST5 is closed in order to enable the windings of the relays of converter D/A to be energized by signals F1 to F10 outgoing from said program unit. When, instead, contact RST5 is open, the program unit has no control over the relays of converter D/A. More particularly, under these conditions, all the relays of converter D/A are certainly deenergized, similarly to what happens upon reading a zero position order on the tape.

Therefore, it can be said that, when contact RST5 is open, converter D/A acts as if it were fed by a signal generator producing constant positional orders, in particular zero position orders. Said constant order generator may, of course, consist of an independent signal source supplying 10 constant binary signals and having ten outputs which may be connected to the ten inputs of converter D/A in lieu of the outputs of the bistable devices F1 to F10.

On output 13X of the position measuring transformers IX there is obtained a sinusoidal signal having a 10 kHz. frequency, a maximum amplitude proportional to the difference between the present position of the movable part TP along axis X and the position represented by the order staticized in the bistable devices F1 to F10, and a phase difference of either $+\pi/2$ radians of $-\pi/2$ radians with respect to the output signal of said oscillator depending on the sign of said position difference.

Similar signals are obtained for axis Y and axis Z on outputs 13Y and 13Z.

Along each axis X, Y, Z, the reference member RSX, RSY, RSZ comprises a series of equally spaced zero positions defined by the position of the poles of fixed winding 8, whereby the movable part TP will be said to lie in a zero position with respect to the reference member when the winding 9, fed by output 11 of converter D/A with said signal proportional to the sine, is phased with said fixed winding 8, so that the respective poles are face to face.

The signals obtained on outputs 13X, 13Y, 13Z and amplified respectively by amplifiers 16X, 16Y, 16Z, are transferred through sampling switches 17X, 17Y, 17Z, to condenser-type analog memories 18X, 18Y, 18Z, apt to store the maximum amplitude of said signals, in order to feed, through servoamplifiers 19X, 19Y, 19Z, servomotors SMX, SMY, SMZ.

Each sampling switch 17X, 17Y, 17Z is normally off and is apt to be turned on so as to establish a negligible impedance path therethrough during the entire time interval in which a sampling pulse is present on its control input 20X, 20Y, 20Z. Each single-throw switch 17X, 17Y, 17Z may be conveniently made of a transistor circuit of a kind well known in the art. As described in the above mentioned patent application 400,986, said sampling pulse is fed to close the sampling switch of a certain axis X, Y, Z only upon receiving a conditioning signal obtained by comparing each new order supplied by the program unit and the order which, being stored in the condenser type memory 18X, 18Y, 18Z, at present controls the relevant servomotor. More particularly, said sampling pulse is either fed to the relevant switch or not, whereby said new order is either sent to replace the preceding one in said condenser memory or not, depending on whether the result of said comparison, representing the difference between the positions defined by said two orders, is below a predetermined limit or not.

Said comparison of the new order and the old order is performed, for each axis, by an amplitude checking circuit 25X, 25Y, 25Z having two inputs connected to the two poles of the switch 17X, 17Y, 17Z respectively and apt to supply a signal on the output 26X, 26Y, 26Z respectively, throughout the time in which the difference between the amplitudes of the signals present on said two inputs exceeds a predetermined value.

For each axis, on the line connecting the condenser memory 18X, 18Y, 18Z and the servoamplifier 19X, 19Y, 19Z, there is inserted a double throw switch 40X, 40Y, 40Z, said switch being set either in the position 1KX, 1KY, 1KZ shown in FIG. 1, or in the other position 2KX, 2KY, 2KZ, depending on whether a signal AMX, AMY, AMZ is present or absent. In position 1K said switch connects the servoamplifier 19X, 19Y, 19Z to the memory 18X, 18Y, 18Z, so that the servomotor SMX, SMY, SMZ is controlled by the positional orders outgoing from the program unit, whereas in position 2K said switch connects the servoamplifier 19X, 19Y, 19Z, to a coarse positioning device QX, QY, QZ. Each coarse positioning device QX, QY, QZ comprises a potentiometer PTX, PTY, PTZ respectively, manually operable to supply, on the output 41X, 41Y, 41Z, respectively, a signal apt to control the corresponding servomotor SMX, SMY, SMZ. The above mentioned signals AMX, AMY, AMZ serve the purpose of breaking the loop of the servosystem of the corresponding axis in order to release the respective servomotor SMX, SMY, SMZ from the control of the positional orders outgoing either from the tape reader 2 or from the constant positional order generator and to subject said servomotor to the control of the coarse positioning device QX, QY, QZ. Said signals AMX, AMY, AMZ are produced by an axis selecting device 42 (FIG. 2) hereinafter described.

The output signals of the bistable devices F11 and F12, which, as already stated, represent an address, feed an address decoder 3 comprising four "and" gates 4, 5, 6, 7 and apt to selectively energize one of the four outputs X, Y, Z, A, depending on whether the order at present read on the tape and staticized in the bistable device F1 to F10 refers to axis X, to axis Y, to axis Z or to the auxiliary functions respectively. Each address signal X, Y, Z, A is generated only upon performing a successful parity check on the group of bits to which said address signal refers and only upon receiving a clock signal read on track P14 and staticized in the bistable device F14. More particularly, the outputs of the bistable devices F1 to F13 feed a parity check circuit 33 which energizes output 34 to allow the "and' gates 4, 5, 6, 7 to be opened only if the number of bits equal to "1" stored in said bistable devices F1 to F13 is even.

The address signals X, Y, Z, by acting on the gates 27X, 27Y, 27Z, respectively, select the outputs PX, PY, PZ of the differential circuits 25X, 25Y, 25Z respectively.

Address signal A selects and makes operative an auxiliary order decoder 23 fed by the outputs of the bistable devices F1 to F10. Each output of decoder 23 controls a corresponding auxiliary function of the machine. Outputs X, Y, Z of address decoder 3 may be connected to terminals AX, AY, AZ through contacts RST1, RST2, RST3 of relay RST, when these contacts are in a first position as shown in FIG. 1.

Alternatively said contacts, if placed in the other position, can connect said terminals AX, AY, AZ to outputs X0, Y0, Z0, of a fictitious address generator 39, which is apt to cyclically activate said outputs X0, Y0, Z0 (FIG. 3). Said fictitious address generator 39 may be, for instance, a counter.

The contacts of relay RST are shown in FIG. 1 in the position they assume when the relay is energized.

As will be seen, relay RST remains energized from the moment when the tape reader reads the first group of thirteen bits, which has the meaning of a special "start" auxiliary order, until the moment when it reads an auxiliary order having the meaning of a "stop" order. In other words, relay RST remains energized throughout the entire automatic execution of the program, inasmuch as it is energized by signal ST produced by the first group of bits read on the tape and de-energized by the signal "STOP" produced by the last group of bits read on the tape.

The signals present on conductors AX, AY, AZ are used to select switches 17X, 17Y, 17Z through gates 22X, 22Y, 22Z respectively. Furthermore, each one of said signals AX, AY, AZ is apt to start the oscillator 14. After performing five complete oscillations, oscillator 14 (FIG. 3) stops automatically, in a manner known per se. The oscillator 14 feeds, besides converter D/A, a pulse generator 15, apt to produce a sampling pulse SP whenever the sinusoidal signal supplied by oscillator 14 passes from a negative value to a positive value (FIG. 3). Said sampling pulses are employed to strobe the opening of switches 17X, 17Y, 17Z.

More particularly, the sampling pulses SP, after passing a gate 210, whose function will be explained later, are sent, through line S, either to the switch 17X or 17Y or 17Z depending on whether signal AX, AY or AZ opens gate 22X, 22Y or 22Z respectively, that is depending on whether the order at present considered is a positional order relating to axis X, Y, or Z.

Accordingly, it is apparent that, upon reading a positional order relating to a certain axis, only the switch 17X, 17Y, 17Z corresponding to said axis is closed and that this switch is closed only when a peak occurs in the sinusoidal signal present on the output 13X, 13Y, 13Z of the corresponding position measuring transformer 1X, 1Y, 1Z (FIG. 3), whereby the corresponding condenser-type memory 18X, 18Y, 18Z is charged to a voltage level equal to the maximum amplitude of said output signal 13X, 13Y, 13Z and, therefore, to a level representing the present value of the position error along said axis.

The sampling pulses SP produced by generator 15 are furthermore sent to gates 27X, 27Y, 27Z so that, during each one of said sampling pulses SP, the output PX, PY, PZ of the amplitude checking circuit 25X, 25Y, 25Z respectively of the axis at present selected is energized if the result of the comparison made by said amplitude checking circuit exceeds the aforesaid predetermined limit.

Signals PX, PY, PZ are sent to deenergize a bistable device 280 which, on the other hand, is energized by signal R produced by a delay device 33 fed by bistable device F14 which staticizes the clock signal read on the tape. The bistable device 280, when energized, keeps open the gate 210 to feed therethrough the sampling pulses for controlling the closure of switches 17X, 17Y, 17Z. Gate 210 is furthermore open, regardless of the energization of bistable device 280, throughout the time in which a contact RST4 of relay RST remains closed, i.e., throughout the time in which relay RST remains deenergized. Therefore, when contact RST4 is open, i.e., during the automatic execution of the program, gate 210 is either opened in order to transfer sampling pulses S to the switch 17X, 17Y, 17Z of the selected axis or not depending on whether the comparison made in the amplitude checking circuit 25X, 25Y, 25Z at present selected has produced a signal PX, PY, PZ or not.

Consequently, any new order which, on the basis of said comparison, is found to be wrong inasmuch as it differs exceedingly from the last order accepted and stored in memory 18X, 18Y, 18Z, is ignored, and the servomotor of the corresponding axis continues to be controlled by the last order found acceptable.

Each signal PX, PY, PZ is furthermore sent to an automatic stop device 42X, 42Y, 42Z described in the above mentioned patent application Ser. No. 400,986 and apt to stop the machine upon occurrence, in any sequence of *n* consecutive orders relating to a certain axis, of a certain sequence of orders ignored as failing to satisfy the amplitude check performed by the corresponding amplitude checking circuit.

The check signal staticized in bistable device F14, besides starting the oscillator 14 by producing a signal AX, AY or AZ through address decoder 3, is sent, as already said, to delay device 38, which delays it a time interval equal to the duration of the five oscillations of oscillator 14, namely 500 $\mu$sec. in the present case. The signal R thus obtained on the output of delay device 38 is employed to reset the bistable devices F1 to F14 and to reenergize the bistable device 28, should this have been deenergized by a signal PX, PY, PZ produced by amplitude checking circuits 25X, 25Y, 25Z.

Figure 2:
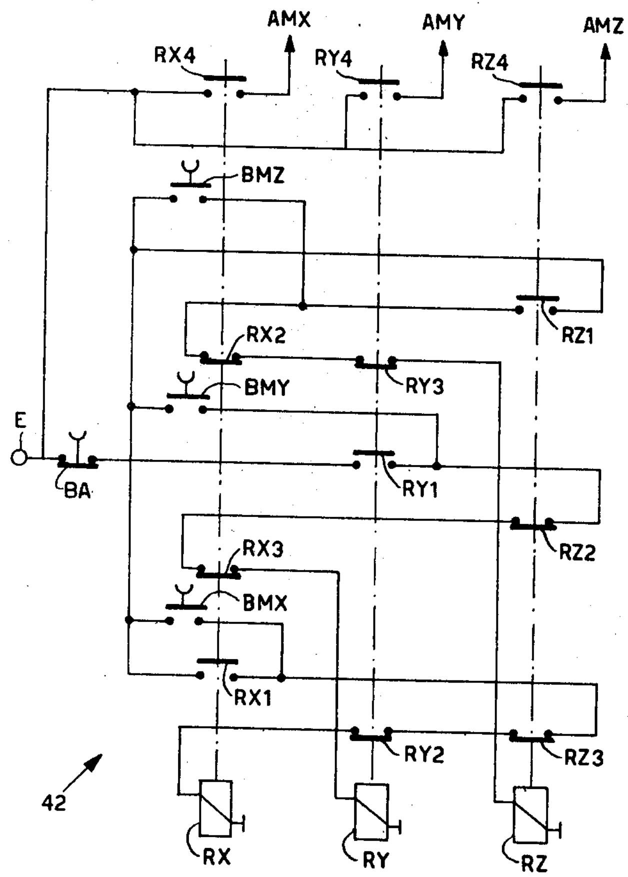
FIG. 2 shows an axis selecting device used in the control device illustrated in FIG. 1.

The axis selector 42 comprises three relays RX, RY, RZ, selectively energizable by voltage source E upon depressing pushbutton switches BMX, BMY, BMZ respectively, as shown in FIG. 2, where all the contacts are shown in their rest position. More particularly, the closure of the contact of the push-button switch BMX, BMY, BMZ causes the relay RX, RY, RZ respectively to be energized, whereby the contact RX1, RY1, RZ1 respectively is closed in order to close a self-locking circuit for said relay so that, even after the re-opening of said contact BMX, BMY, BMZ, said relay RX, RY or RZ remains energized by source E. The winding of each relay RX, RY, RZ is connected in series with the contacts RY2, RZ2, RX2 of the relay RY, RZ and RX respectively and with the contacts RZ3, RX3 and RY3 of the relay RZ, RX and RY respectively. Therefore, the actuation of each push-button BMX, BMY, BMZ energizes the corresponding relay RX, RY, RZ only the other two relays are simultaneously deenergized. It is thus clear that said arrangement of the contacts ensures that no more than one relay RX, RY, RZ may be energized at one time. Once a relay RX, RY, RZ has been energized, it may be deenergized by depressing a button BA, which breaks the connection between source E and all the relays RX, RY, RZ.

Each relay RX, RY, RZ, when energized, keeps closed a contact RX4, RY4, RZ4 respectively, so that on output AMX, AMY, AMZ a signal is present throughout the time in which the relay RX, RY, RZ remains energized. To discontinue said signal AMX, AMY or AMZ it is sufficient to deenergize the relay RX, RY or RZ respectively by opening the switch BA.

The operation of the device according to the invention will now be briefly described.

The piece to be machined according to the program recorded on the tape is first set and clamped on the worktable. Then the power supply is turned on. Under these conditions, as the program tape has not yet started moving, the tape reader 2 has not yet read any order, and the bistable devices F1 to F14 are all deenergized. In particular, the first group of bits recorded in the program tape and which upon being read generates the signal ST for starting the programmed automatic operation, has not yet been read.

Therefore, signal ST is initially absent, so that contacts RST1, RST2, RST3 and RST4 are in the position opposite to the position shown in FIG. 1. Also signals AMX, AMY, AMZ are certainly absent, because none of the push-buttons BMX, BMY, BMZ has been depressed as yet, so that the switches 40X, 40Y, 40Z are in the position 1KX, 1KY, 1KZ as shown in FIG. 1.

The fictitious address generator 39 is activated as soon as the power supply is turned on and remains activated as long as the power supply remains on. Accordingly, generator 39 begins to cyclically energize its outputs X0, Y0, Z0, so that on each one of said outputs X0, Y0, Z0 there is obtained, e.g. every 20 msec., a signal lasting 0.5 msec., the signals on outputs X0, Y0, Z0 being displaced in phase by 5 msec., as shown in FIG. 3.

Through contacts RST1, RST2, RST3, said signals X0, Y0, Z0 are transferred to terminals AX, AY, AZ, which are therefore cyclically energized.

Furthermore, as the contact RST5 is open, all the relays of converter D/A are deenergized. In other words, under these conditions the converter D/A is fed by the already mentioned zero position order generator. More particularly, the first signal produced by the fictitious address generator 39 which is assumed to be signal X0 which energizes output AX, starts oscillator 14, which is thus caused to perform a first cycle of five oscillations. Therefore, outputs 11 and 12 of the digital-to-analog converter produce two sinusoidal waves having an amplitude equal to sin 0=0 and respectively cos 0=1 and a duration equal to five periods. Furthermore, on output SP of sampling pulse generator 15 five pulses SP are obtained. Therefore, five sampling pulses are obtained through gate 210 which is kept permanently open by contact RST4 being closed in the absence of signal ST. Said five sampling pulses S are sent, through gate 22X, to close switch 17X in order to connect servomotor SMX to the output of converter D/A. Subsequently, generator 39 produces a signal X0, which similarly energizes output AY, thus starting again oscillator 14, so as to activate, as before, the outputs of converter D/A and to send five sampling pulses S through gate 22Y to close switch 17Y, whereby servomotor SMY is connected to the outputs of converter D/A. Subsequently, the generator 39 produces a signal Z0, which likewise energizes output AZ, thus starting again oscillator 14 so as to activate, as before, the outputs of converter D/A and to send five sampling pulses through gate 22Z to close switch 17Z, whereby servomotor SMZ is connected to the outputs of converter D/A. Thereafter generator 39 energizes again output X0, then output Y0, then output Z0, and so on cyclically, so that servomotors SMX, SMY, SMZ are cyclically connected, one at a time, to converter D/A which continues to supply on its output a signal simulating a zero position order.

If the position control device is fitted with the aforesaid automatic stop devices 42X, 42Y, 42Z controlled by the amplitude checking circuits 25X, 25Y, 25Z, during this phase it is necessary to prevent operation of said stop device, intrinsically known means being used for this purpose.

It appears from the foregoing that, during this initial phase which immediately follows the switching-on of the power supply, the servosystems of axes X, Y, Z are fed by zero position orders, so that servomotors SMX, SMY, SMZ bring the worktable to, and keep it in, that zero position of the reference member RSX, RSY, RSZ which is nearest to the position in which the worktable was located when switching on the power supply. Accordingly, the displacement to which the table is subjected during this first phase does not exceed the pitch (2 mm.) of the position measuring transformers. In general, after this first positioning phase, the reference point marked on the workpiece does not coincide with the absolute reference point of the machine, nay, it may be separated from said absolute reference point by a distance comprising several pitches of the position measuring transformers.

Therefore, this first positioning phase is followed by a second phase, during which the coarse positioning devices QX, QY, QZ are put into action. During said second phase the displacement of the table is effected along one axis at a time. More particularly, the operator, assuming he wants to consider first axis Y, depresses push-button BMY, so that signal AMY is generated (FIG. 2). Signal AMY causes switch 40X to be set in the contact position 2KY, so that the loop of the servosystem along axis Y is interrupted, and the control of a servomotor SMY is transferred to the coarse positioning device QY, whose potentiometer PTY is now connected to said servomotor through servoamplifier 19Y. By manually adjusting the potentiometer QY it is therefore possible to control the approximate initial position of worktable TP of the machine along axis Y. During this phase (approximate positioning along axis Y) the fictitious address generator 39 continues to cyclically supply signals X0, Y0, Z0 in order to cyclically address the three axes X, Y, Z. In the meantime the zero position order generator continues to operate; however, it is effective only for axes X and Z. Therefore, while the servomotor of axis Y, released from the control of said zero order generator, is placed under the manual control of potentiometer PTY, the servomotors of the other axes X and Z, for which the loop of the servosystem has not been broken, continue to be under the control of said zero order generator, so that along axes X and Z the table TP is kept, by the relative servosystems, in the zero position reached during the first positioning phase.

After the worktable has been positioned along axis Y with a coarse approximation, it is possible to improve said approximation. More particularly, during a third initial-positioning phase the operator, by depressing push-button BA, deenergizes output AMY to return the switch 40Y to position 1KY shown in FIG. 1, so as to close again the loop of the servosystem of axis Y. Therefore servomotor SMY is again brought under the control of the zero position order generator, whereby the servosystem of axis Y will operate so as to bring the worktable to that zero position of reference member RSY which is nearest to the position attained by the table during said approximate positioning.

Thereafter, during a fourth phase of the initial positioning, by acting, either manually or through an auxiliary servosystem, on handwheel MY, it is possible to transmit through the auxiliary adjusting screw VAY to the reference member RSY (fixed winding of the position measuring transformer) a small displacement equal to a fraction of the distance between two successive zero positions of said reference member.

During said fourth phase the loop of the servosystem of axis Y continues to be closed, and is fed by the zero order generator, so that along axis Y the worktable is kept fixed with respect to reference member RSY in the zero position relating to said reference member and reached in the third positioning phase.

Therefore, during this fourth phase, worktable TP and the reference member are maintained solidary and bodily moved along axis Y. According to a characteristic of the invention, said bodily movement is achieved inasmuch as their positions are made dependent on each other through the servosystem of axis Y placed under the control of the zero position orders produced by the zero order generator. In other words, the two members of position measuring transformer are mechanically coupled via the servoloop, whereby by displacing reference member RSY, also the sensing member SSY and the worktable are displaced bodily therewith.

During said second, third and fourth phases of the initial positioning operation along axis Y, the servosystems of axes X and Z continue to be controlled by the zero order generator and selected by the fictitious address generator 39 in order to keep worktable TP in the position attained along axes X and Z in the first positioning phase. From the foregoing it appears that, till the end of the third initial positioning phase relating to axis Y, the various positioning operations, which involve the actuation of potentiometer PTY and subsequent openings or closings of the loop of the servosystem of axis Y, result in the table being set in one of the zero positions relating to reference member RSY.

Therefore, if the difference between the relative reference point and the absolute reference point as existing just after the clamping of the workpiece on the table did not comprise a whole number of pole pitches of the reference member, then with said first three positioning phases it will be possible to attain only that zero position of the reference member which is nearest to the final position, whereby the positioning will be approximate by a fraction of pitch. During a fourth phase of the initial positioning operation, by acting on auxiliary adjusting screw VAY, the positioning will be completed by bodily displacing the table and of the reference member an extent equal to said fraction of pitch.

When the initial positioning along axis Y is completed, a similar positioning is made, e.g., along axis X. For this purpose, the operator depresses push-button RMX in order to produce signal AMX which places servomotor SMX under the control of potentiometer PTX. Therefore, a second approximate positioning phase relating to axis X occurs. Thereafter, the operator depresses push-button BY to institute a third initial positioning phase relating to axis X, during which the table is moved into that zero position of the reference member which is nearest to the position attained during said second phase. Thereafter, in a fourth initial positioning phase relating to axis X, the operator displaces the reference member RSX by acting on auxiliary adjusting screw VAX through handwheel MX in order to refine the positioning along axis X.

The initial positioning along the remaining axis Z is effected in a similar manner.

Once the above mentioned initial positioning operations along the three axes have been carried out, the three servomotors SMX, SMY, SMZ continue to remain under the control of the zero position order generator, and the fictitious address generator 39 continues to operate, so that the worktable is kept in the position attained by the three servosystems during said initial positioning. It should be noted that the structure of the axis selector 42, which is such that signals AMX, AMY, AMZ exclude each other mutually, helps avoiding manual errors in the above mentioned initial positioning operations, inasmuch as it enables the manual control, by means of the potentiometer, to be effective for one axis only at a time. Therefore, when initially positioning the worktable along a certain axis, any wrong actuation of buttons BMX, BMY, BMZ is prevented from giving rise to a variation in the position already reached along the other axes. At the end of said operations for initially positioning the worktable, it is possible to start the tape reader 2, for beginning the automatic operation of the device under the control of the program unit. The first order read on the program tape is always the auxiliary "start" function which, through the auxiliary order decoder 23, generates signal ST. This start signal energizes relay RST, which is thereafter kept energized via contact RST6 and contact RH1 by voltage source V. Since relay RST is energized, contacts RST1, RST2, RST3, RST4 and RST5 are set into the position shown in FIG. 1.

More particularly, contacts RST1, RST2, RST3 connect terminals AX, AY, AZ to the address decoder 3, while disconnecting them from the fictitious address generator 39. Therefore, the fictitious address generator, while continuing to produce signals X0, Y0, Z0, is no longer effective in selecting the axes of the positioning device. Contact RST5 is closed so that voltage source AL is connected to the windings of the relays of the digital-to-analog converter D/A, whereby the converter D/A is now fed by the output signals of the bistable devices F1 to F10, instead of being fed by the constant order generator. Moreover, contact RST4 is open, so that gate 210 is now controlled by the output of bistable device 280. Furthermore, if the control device is provided with the previously mentioned automatic stop device 42X, 42Y, 42Z, upon energizing relay RST said automatic stop devices, which, as already said, had been switched off during the initial positioning of the table, are made operative. Of course, during the automatic operation controlled by the program tape, no manipulation is made on the axis selector 42, so that the coarse positioning devices QX, QY, QZ do not interfere with the operation of the servomotors.

After reading said "start" auxiliary order, tape reader 2 reads the first positional order, which refers to axis X. Therefore output AX is energized through decoder 3, so that oscillator 14 is started to perform a cycle of five oscillations.

Consequently, the digital-to-analog converter D/A supplies on outputs 11 and 12 the signals representing said first positional order relating to axis X, while the pulse generator 15 supplies five sampling pulses S, which close switch 17X to transfer said first order to condenser-type memory 18X for controlling servomotor SMX. Subsequently, the first positional order relating to axis Y is read from the tape, then the first positional order relating to axis Z is read, said orders being likewise sent to control servomotors SMY and SMZ. Thereafter tape reader 2 reads an auxiliary order which, having been decoded by decoder 23, will act on the appropriate machine part. Thereafter tape reader 2 reads the second block of information comprising the second positional order relating to axis X, the second positional order relating to axis Z, the second auxiliary order, and so on for the successive blocks. The operation of the digital position control device described herein with reference to FIG. 1, in the phases in which the servomotors are controlled by the program unit, is essentially the same as described in the above mentioned patent application Ser. No. 400,986. Therefore, no further details are given here.

It has been seen that, in consequence of the initial positioning operations, the worktable is set in a zero position of the reference member. Therefore, if, in preparing the program, care has been taken to make the origin of the coordinates coincident with the first point of the profile to be followed by the movable part of the machine, so that the first positional order recorded on the tape is equal to zero, then upon starting the tape reader the movable part will begin to follow the programmed profile without any sudden motion. In general the program will, moreover, provide for a final stop point and, possibly, for intermediate stop points. These intermediate stop points enable the operator to check up the progress of the machining operation, in particular the dimensions of the portion of profile cut so far. Stopping the movable part in one of said stop points is determined by a "stop" auxiliary order recorded on the tape, which, upon being read generates, through decoder 23, a STOP signal. Said STOP signal energizes relay RH, which therefore, by opening contact RH1, deenergizes relay RST. This relay being deenergized, the servosystems of axes X, Y, Z are released from the control of the orders read from the tape and are, instead, subjected to the control of the zero order generator, which co-operates with the fictitious address generator 39. More particularly, upon reading a stop order the control device is brought in the same situation immediately preceding the starting of the tape. It appears, therefore, that, following the reading of each stop order, the movable part is kept at rest by the servo-systems in the position so far reached.

In preparing the program said stop points can, of course, be preset only in such positions as are distant from the origin of the coordinates a whole number of pole pitches of the position measuring transformers, inasmuch as the constant order generator, when the machine is thus stopped, generates only zero position orders. The constant order generator may obviously be modified so that it always repeats the last order read from the tape, in which case said limitation in the programming ceases to exist.

It is understood that the device according to the invention can operate also if the orders of the program, instead of representing continuous points of a continuous profile, represent comparatively distant points. In other words, the device is equally applicable to a continuous contouring control system or to a point-to-point positioning control system.

From the foregoing description it will be understood that many changes may be made in the above device, and different embodiments of the invention could be made without departing from the limits thereof.

It is, therefore, intended that all matter contained in the above description or shown in the accompanying drawings shall be interpreted as illustrative, and not in a limiting sense.

What I claim is:

1. In a control device for positioning a movable member of a machine tool and similar equipment along one or more axes according to positional orders with respect to a first reference point, (a) a servosystem allotted to each axis, including a displaceable reference member having at least a second reference point, and responsive to positional orders applied thereto for moving said movable member along said axis according to said positional orders with respect to said second reference point, (b) a program device supplying positional orders each one representing with respect to a third reference point a position of said movable member along one of said axes, (c) means for starting operation of said program device, (d) means connected between said program device and said servosystem for applying to said servosystem said supplied orders, (e) and means manually operable prior to said starting means for displacing said reference member with respect to said first reference point to compensate for difference between said first and second reference points.

2. In a control device for positioning a movable member of a machine tool and similar equipment according to positional orders relatively to a first reference point, (a) a servosystem including a servomotor and a displaceable reference member having at least a second reference point, and responsive to positional orders applied thereto for moving said movable member according to said positional orders relatively to said second reference point, (b) a program device for applying to said servosystem positional orders each one representing relatively to a third reference point a position of said movable member, (c) means manually operable for energizing said servomotor independently from said servosystem to displace said movable member relatively to said first reference point to approximately compensate for difference between said first and second reference points.

(d) a constant positional order generator for repeatedly apply to said servosystem a constant positional order representing in digital form the position of said second reference point, (e) means manually operable subsequent to operation of said energizing means for starting operation of said generator, whereby said movable member is moved by said servosystem to said second reference point, (f) means manually operable concurrently with operation of said generator to displace said reference member to finely compensate for difference between said first and second reference points, (g) and means operable after said last mentioned means for starting operation of said program device.

3. In a control device for moving a member of a machine tool along a predetermined continuous trajectory, said member being movable along at least two axes, (a) a servosystem for each axis including a reference member and responsive to applied orders for moving said movable member along said axis relatively to said reference member, (b) a program device for supplying successive orders, each one representing in digital form an instantaneous position of said movable member along one of said axes and having associated therewith an address identifying in digital form said order as pertaining to the last mentioned axis, the orders pertaining to the different axes being supplied in cyclically interlaced sequence.

(c) a constant order generator for repeatedly supplying for said axis a constant positional order representing in digital form a position at which said member must be held along said axis, (d) a fictitious address generator operable concurrently with said constant order generator for supplying a fictitious address according to said cyclically interlaced sequence, whereby each constant positional order is associated with a fictitious address, (e) switching means responsive to said addresses for applying each supplied order to the relevant axis according to the associated address, (f) and means for conditioning said program device and said constant order generator for alternative operation.

4. In a control device for positioning a movable member of a machine tool and similar equipments along at least two axes according to positional orders relatively to a first reference point, (a) a different servosystem allotted to each axis, including a servomotor and a displaceable reference member having at least a second reference point, and responsive to positional orders applied thereto for moving said movable member along said axis according to said positional orders relatively to said second reference point, (b) a program device for applying to said servosystem positional orders each one representing relatively to a third reference point a position of said movable member along said axis, (c) means manually operable for energizing said servomotor independently from said servosystem to displace said movable member relatively said first reference point to approximately compensate for difference between said first and second reference points, (d) a constant positional order generator for repeatedly applying to said servosystem a constant positional order representing in digital form the position of said second reference point, (e) means manually operable subsequent to operation of said energizing means for starting operation of said generator, whereby said movable member is moved by said servosystem to said second reference point, (f) means manually operable concurrently with operation of said generator to displace said reference member along said axis to finely compensate for difference between said first and second reference points, (g) means effective during operation of said energizing means and of said displacing means for preventing operation of the energizing and displacing means of the other axes and simultaneously ensuring operation of the order generator for said other axes, (h) and means operable after said last mentioned means for starting operation of said program device.

5. In a control device for moving a member of a machine tool along a predetermined continuous trajectory, (a) a servosystem responsive to positional orders applied thereto for moving said member, (b) a program device supplying to said servo-system successive positional orders, each one representing in digital form an instantaneous position of said member along said trajectory, (c) a generator able to produce a predetermined constant digital positional order as set up therein which is repeatedly supplied to said servosystem in order to cause this last to keep said member in a predetermined fixed position, and (d) switching means conditioning said program device and said generator to operate alternatively in supplying said servosystem, and comprising bistable means settable in a first state and resettable in a second state in response to start and stop signals respectively issued from said program device, said bistable device in said second state conditioning said generator for operation.

References Cited

UNITED STATES PATENTS

| | | | |
|---|---|---|---|
| 3,011,113 | 11/1961 | Jerue et al. | 318—162 XR |
| 3,284,618 | 11/1966 | Gotz et al. | 318—18 XR |
| 3,327,101 | 6/1967 | Evans | 318—162 XR |
| 3,340,451 | 9/1967 | Farrand | 318—162 |

BENJAMIN DOBECK, Primary Examiner

U.S. Cl. X.R.

318—28